United States Patent
Aguilera et al.

(10) Patent No.: US 7,254,646 B2
(45) Date of Patent: Aug. 7, 2007

(54) ANALYSIS OF CAUSAL RELATIONS BETWEEN INTERCOMMUNICATING NODES

(75) Inventors: Marcos Kawazoe Aguilera, Palo Alto, CA (US); Jeffrey Clifford Mogul, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 961 days.

(21) Appl. No.: 10/601,371

(22) Filed: Jun. 23, 2003

(65) Prior Publication Data

US 2005/0015424 A1    Jan. 20, 2005

(51) Int. Cl.
*G06F 15/16* (2006.01)
(52) U.S. Cl. ............... 709/249; 370/470; 370/471; 370/395
(58) Field of Classification Search ........ 709/249; 370/470, 471, 395; 713/153
See application file for complete search history.

(56) References Cited

U.S. PATENT DOCUMENTS

| | | | |
|---|---|---|---|
| 6,125,368 A * | 9/2000 | Bridge et al. | 707/201 |
| 6,363,083 B1 * | 3/2002 | Spielbauer et al. | 370/470 |
| 6,687,752 B1 * | 2/2004 | Falco et al. | 709/230 |
| 2003/0110408 A1 * | 6/2003 | Wells et al. | 714/1 |

OTHER PUBLICATIONS

Y. Zhang and V. Paxson, Detecting Stepping Stones, Proc. 9th USENIX Security Symposium, Aug. 2000. http://www.icir.org/vern/papers/stepping-sec00.ps.gz.

Y. Zhang and V. Paxson, Detecting Backdoors, Proc. 9th USENIX Security Symposium, Aug. 2000. http://www.icir.org/vern/papers/backdoor-sec00.ps.gz.

D. Donoho, A.G. Flesia, U. Shankar, V. Paxson, J. Coit, and S. Staniford, Multiscale Stepping-Stone Detection: Detecting Pairs of Jittered Interactive Streams by Exploiting Maximum Tolerable Delay, Proc. RAID 2002. http://www.icir.org.vern/papers/multiscale-stepping-stone.RAID02.pdf.

M. Chen, E. Kiciman, A. Accardi, A. Fox, and E. Brewer, Using runtime paths for macroanalysis. In *Proc. HotOS-IX*, Kauai, HI, May 2003.

M. Chen, E. Kiciman, E. Fratkin, A. Fox, and E. Brewer, Pinpoint: Problem determination in large, dynamic systems, In *Proc. 2002 Intl. Conf. on Dependable Systems and Networks*, pp. 595-604, Washington, DC, Jun. 2002.

(Continued)

*Primary Examiner*—Krisna Lim

(57) ABSTRACT

Method and apparatus for determining causal relations between a plurality of intercommunicating nodes. In various embodiments, trace data is input that describe inter-node communication. The trace data may include for each message sent between nodes a timestamp that indicates a time at which the message was sent, a source identifier that identifies a node from which the message was sent, and a destination identifier that identifies a node to which the message was sent. For each of one or more nodes, a determination may be made as to whether one or more causal relations exist between a first set of messages destined to the node and a second set of messages sourced from the node and destined to at least one other node. A causal relation may exist as a function of a probability distribution of delay values that are differences between timestamps of messages in the second set and timestamps of messages in the first set. From the nodes and causal relations a processor-readable representation is generated.

31 Claims, 8 Drawing Sheets

| | 550 |
|---|---|
| Find_Caused_Messages (V, Z) | |
| 552 | $i := 0$ |
| 554 | Nodes := Find_Related_Nodes (V, Z) |
| 556 | For each node *j* in Nodes do |
| 558 | $Z_0$ := messages in Z with destination *j* |
| 560 | $V_0 := V$ |
| 562 | W := empty set |
| 564 | Delay_set := empty set |
| 566 | While true do |
| 568 | If min {$|V_0|$, $|Z_0|$} <= MinSize then exit while loop |
| 570 | C := Find_Correlation ($V_0$, $Z_0$) |
| 572 | If maximum of C(*t*) is not prominent then exit while loop |
| 574 | d := position of the maximum of C(*t*) |
| 576 | $Z_1$ := messages in $Z_0$ having timestamps equal to timestamps in $V_0$ shifted by d |
| 578 | $V_1$ := messages in $V_0$ having timestamps equal to timestamps in $Z_1$ shifted by -d |
| 580 | W := union (W, $Z_1$) |
| 582 | Delay_set := union (Delay_set, {d}) |
| 584 | $V_0 := V_0 - V_1$; $Z_0 := Z_0 - Z_1$ |
| 586 | $i := i + 1$; $O_i$.node := *j*; $O_i$.delay := Delay_set; $O_i$.messages := W |
| 588 | Return $O_1, O_2, ..., O_i$ |

OTHER PUBLICATIONS

C. Hrischuk, J. Rolia, and C. Woodside. Automatic generation of a software performance model using an object-oriented prototype, In *Proc. MASCOTS '95*, pp. 399-409, Durham, NC, Jan. 1995.

R. Isaacs and P. Barham, Performance analysis in loosely-coupled distributed systems. In *7th CaberNet Radicals Workshop*, Bertinoro, Italy, Oct. 2002.

* cited by examiner

| 200 |
|---|
| GENERATE GRAPH |

| | |
|---|---|
| 202 | Output graph := empty |
| 204 | $T_i$ := trace of messages with source $i$, for every $i$ |
| 206 | Add a new vertex $x_{initial\_node}$ labeled initial_node to output graph |
| 208 | For each destination node $j$ in $T_{initial\_node}$ with destination $j$ |
| 210 |     $V$ := messages in $T_{initial\_node}$ with destination $j$ |
| 212 |     Create vertex $x_j$ labeled $j$ and edge $(x_{initial\_node}, x_j)$ labeled 0 to output graph |
| 214 |     Process_Node $(j, x_j, V)$ |

FIG. 4

| 250 |
|---|
| Process_Node $(j, x_j, V)$ |

| | |
|---|---|
| 252 | $O_1, ..., O_m$ := Find_Caused_Messages $(V, T_j)$ |
| 254 | For $i$ := 1 to $m$ do |
| 256 |     $k$ := $O_i$.node; $W$ := $O_i$.messages; $d$ := $O_i$.delay |
| 258 |     Add a new vertex $x_k$ labeled $k$ and edge $(x_j, x_k)$ labeled $d$ to output graph |
| 260 |     Process_Node $(k, x_k, W)$ |

FIG. 5

| 300 |
|---|
| Find_Caused_Messages $(V, Z)$ |

| | |
|---|---|
| 302 | $i$ := 0 |
| 304 | $C$ := Find_Correlation $(V, Z)$ |
| 306 | Find positions of spikes of $C(t)$ |
| 308 | For each spike position $d$ found do |
| 310 |     $Z_0$:=messages in $Z$ having timestamps equal to timestamps in $V$ shifted by $d$ |
| 312 |     For each destination node $j$ in $Z_0$ do |
| 314 |         $i$ := $i$ + 1 |
| 316 |         $O_i$.node :=$j$; $O_i$.delay := $d$; $O_i$.messages := messages in $Z_0$ with destination $j$ |
| 318 | Return $O_1, O_2, ..., O_i$ |

FIG. 6

| 350 | Find_Correlation (V, Z) |
|---|---|
| 352 | $s_1(t)$ := indicator function for V |
| 354 | $s_2(t)$ := indicator function for Z |
| 356 | C := Correlation ($s_2$, $s_1$) |
| 358 | Return C |
FIG. 7
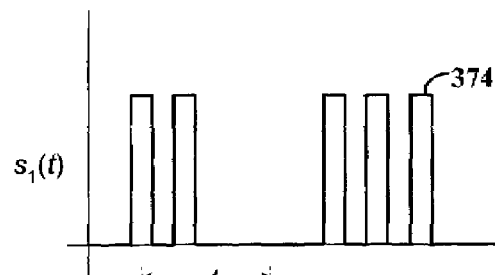
FIG. 8A
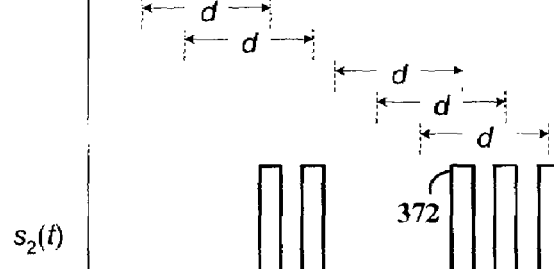
FIG. 8B
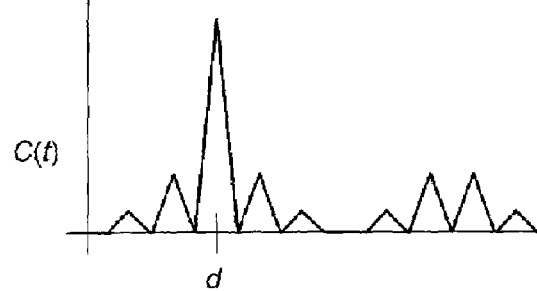
FIG. 8C

| | | 400 |
|---|---|---|
| | Find_Caused_Messages (V, Z) | |
| 402 | $i := 0$ | |
| 404 | Nodes := Find_Related_Nodes (V, Z) | |
| 406 | For each node j in Nodes do | |
| 408 | | $Z_0$ := messages in Z with destination j |
| 410 | | C := Find_Correlation (V, $Z_0$) |
| 412 | | Find positions of spikes of C(t) |
| 414 | | For each spike position d found do |
| 416 | | $Z_1$ := messages in $Z_0$ having timestamps equal to timestamps in V shifted by d |
| 418 | | |
| 420 | | $i := i + 1$; $O_i$.node := j; $O_i$.delay := d; $O_i$.messages := $Z_1$ |
| 422 | Return $O_1, O_2, ..., O_i$ | |

FIG. 9

| | | 450 |
|---|---|---|
| | Find_Related_Nodes (V, Z) | |
| 452 | Nodes := empty set | |
| 454 | C := Find_Correlation (V, Z) | |
| 456 | Find positions of spikes of C(t) | |
| 458 | For each spike position d found do | |
| 460 | | $Z_0$ := messages in Z having timestamps equal to timestamps in V shifted by d |
| 462 | | Nodes := union (Nodes, {nodes that appear as destinations in $Z_0$}) |
| 464 | Return Nodes | |

FIG. 10

| | 500 |
|---|---|
| Find_Caused_Messages (V, Z) | |
| 502 | $i := 0$ |
| 504 | Nodes := Find_Related_Nodes (V, Z) |
| 506 | For each node $j$ in Nodes do |
| 508 | $Z_0$ := messages in Z with destination $j$ |
| 510 | $V_0 := V$ |
| 512 | While true do |
| 514 | If min $\{|V_0|, |Z_0|\}$ <= MinSize then exit while loop |
| 516 | $C$ := Find_Correlation $(V_0, Z_0)$ |
| 518 | If maximum of $C(t)$ is not prominent then exit while loop |
| 520 | $d$ := position of the maximum of $C(t)$ |
| 522 | $Z_1$ := messages in $Z_0$ having timestamps equal to timestamps in $V_0$ shifted by $d$ |
| 524 | $V_1$ := messages in $V_0$ having timestamps equal to timestamp in $Z_1$ shifted by $-d$ |
| 526 | $i := i + 1$; $O_i$.node $:= j$; $O_i$.delay $:= d$; $O_i$.messages $:= Z_1$ |
| 528 | $V_0 := V_0 - V_1$; $Z_0 := Z_0 - Z_1$ |
| 530 | Return $O_1, O_2, ..., O_i$ |

FIG. 11

| | | 550 |
|---|---|---|
| | Find_Caused_Messages (V, Z) | |
| 552 | $i := 0$ | |
| 554 | Nodes := Find_Related_Nodes (V, Z) | |
| 556 | For each node $j$ in Nodes do | |
| 558 | | $Z_0$ := messages in Z with destination $j$ |
| 560 | | $V_0 := V$ |
| 562 | | $W$ := empty set |
| 564 | | Delay_set := empty set |
| 566 | | While true do |
| 568 | | If min $\{|V_0|, |Z_0|\}$ <= MinSize then exit while loop |
| 570 | | $C$ := Find_Correlation ($V_0, Z_0$) |
| 572 | | If maximum of $C(t)$ is not prominent then exit while loop |
| 574 | | $d$ := position of the maximum of $C(t)$ |
| 576 | | $Z_1$ := messages in $Z_0$ having timestamps equal to timestamps in $V_0$ shifted by $d$ |
| 578 | | $V_1$ := messages in $V_0$ having timestamps equal to timestamps in $Z_1$ shifted by $-d$ |
| 580 | | $W$ := union ($W, Z_1$) |
| 582 | | Delay_set := union (Delay_set, $\{d\}$) |
| 584 | | $V_0 := V_0 - V_1$; $Z_0 := Z_0 - Z_1$ |
| 586 | $i := i + 1$; $O_i$.node := $j$; $O_i$.delay := Delay_set; $O_i$.messages := $W$ | |
| 588 | Return $O_1, O_2, ..., O_i$ | |

FIG. 12

| | | |
|---|---|---|
| | Find_Related_Nodes (V, Z) | 600 |
| 602 | Nodes := empty set | |
| 604 | $V_0 := V; Z_0 := Z$ | |
| 606 | While true do | |
| 608 | | If min $\{|V_0|, |Z_0|\}$ <= MinSize then exit while loop |
| 610 | | C := Find_Correlation ($V_0, Z_0$) |
| 612 | | If maximum of C(t) is not prominent then exit while loop |
| 614 | | d := position of the maximum of C(t) |
| 616 | | $Z_1$ := messages in $Z_0$ having timestamps equal to timestamps in $V_0$ shifted by d |
| 618 | | i := node that is the most frequent destination in $Z_1$ |
| 620 | | Nodes := union (Nodes, {i }) |
| 622 | | $Z_2$ := messages in $Z_1$ with destination i |
| 624 | | $V_2$ := messages in $V_0$ having timestamps equal to timestamps in $Z_2$ shifted by -d |
| 626 | | $V_0 := V_0 - V_2; Z_0 := Z_0 - Z_2$ |
| 628 | Return Nodes | |

FIG. 13

ANALYSIS OF CAUSAL RELATIONS BETWEEN INTERCOMMUNICATING NODES

FIELD OF THE INVENTION

The present disclosure generally relates to analyzing the relationships between messages sent between nodes.

BACKGROUND

Many commercially-important systems, especially Web-based applications, are composed of a number of communicating components. These systems are often structured as distributed systems, with components running on different processors or in different processes. For example, a multi-tiered system may process requests from Web clients that flow through a Web-server front-end and then to a Web application server. The application server may then call a database server, for example, or other types of services such as for authentication, name service, credit-card authorization, or customer relationship management or other support functions.

Distributed systems can be difficult to debug, especially when users experience poor performance. Diagnosing performance issues is even more difficult in distributed systems if the constituent components are composed of "black-box" components. For example, some distributed systems may be constructed from software from many different, and perhaps competing, vendors, and the source code of the different components may be unavailable. Without more than a high-level understanding of the functions provided by the various components, and without the information that could be learned from examination of the source code, selecting a component to begin investigating may involve guesswork and result in wasted time.

The business model under which distributed systems are sold and deployed also contributes to the difficulties associated with addressing performance problems. Enterprises often buy complex systems as complete, customized packages from solutions vendors. Solutions vendors may be pressured to deliver complex component-based systems without the expense of highly-skilled, experienced programmers. While modestly-skilled programmers can design and construct such systems, they may lack the expertise to debug performance problems efficiently. Vendors of individual components may provide training and support for solving performance problems within the components, but not necessarily support for solving performance problems when components from other vendors are involved. Thus, whole-system performance debugging may require either an inordinate amount of time or the services of expensive and hard-to-find systems integration experts. The present invention may address one or more of the above issues.

SUMMARY

The various embodiments of the invention support determining causal relations between a plurality of intercommunicating nodes. Communications between the nodes may be described by input trace data. The trace data may include for each message sent between nodes a timestamp that indicates a time at which the message was sent, a source identifier that identifies a node from which the message was sent, and a destination identifier that identifies a node to which the message was sent. For each of one or more nodes, a determination is made as to whether one or more causal relations exist between a first set of messages destined to the node and a second set of messages sourced from the node and destined to at least one other node. A causal relation may exist as a function of a probability distribution of delay values that are differences between timestamps of messages in the second set and timestamps of messages in the first set. From the nodes and causal relations a processor-readable representation is generated.

It will be appreciated that various other embodiments are set forth in the Detailed Description and Claims which follow.

BRIEF DESCRIPTION OF THE DRAWINGS

FIG. 4 illustrates an example process for generating a graph in accordance with various embodiments;

FIG. 5 illustrates an example process for processing a node in accordance with embodiments of the invention;

FIG. 6 illustrates an example process for inferring causation between sets of messages destined to a node and sets of messages sourced from the node in accordance with embodiments of the invention;

FIG. 7 illustrates an example process for finding a correlation between messages destined to a node and sets of messages sourced from the node in accordance with embodiments of the invention;

FIGS. 8A and 8B illustrate indicator functions that signal occurrences of messages versus time for messages destined to a node and sets of messages sourced from the node respectively;

FIG. 8C contains a graph of a cross-correlation function of the indicator functions of FIGS. 8A and 8B.

FIG. 9 illustrates an alternative example process for inferring causation between sets of messages destined to a node and sets of messages sourced from the node in accordance with embodiments of the invention;

FIG. 10 illustrates an example process invoked by the process of FIG. 9 for selecting a relevant set of destination nodes based on a cross-correlation between two sets of messages in accordance with embodiments of the invention;

FIG. 11 illustrates another alternative example process for inferring causation between sets of messages destined to a node and sets of messages sourced from the node in accordance with embodiments of the invention;

FIG. 12 illustrates another alternative example process for inferring causation between sets of messages destined to a node and sets of messages sourced from the node in accordance with embodiments of the invention; and FIG. 13 illustrates other embodiments for selecting sets of relevant destination nodes in accordance with embodiments of the invention.

DETAILED DESCRIPTION

The various embodiments described herein infer causal relations of messages sent between nodes, where the causal relations may assist in locating performance problems. The nodes may represent host computer systems in a distributed data processing arrangement, computer processes, threads, active objects, disk drives or various combinations thereof. The inner functions of the constituent nodes need not be apparent to infer the causal relations. The nodes and communication relationships may be represented as a graph, with vertices in the graph representing the nodes and edges between the vertices representing communications between the nodes.

The causal relations may be inferred from traced communication information. The nodes may be determined from the traced communication information and may be represented as vertices in a graph. An edge may be added to the graph to connect two vertices that represent nodes that communicate, as indicated by the traced communication information. A causal relation may be inferred between a source node and a destination node from delays between messages destined to the source nodes and messages from the source node to the destination node. Each inferred causal relation may be represented as a delay value that is associated with the edge from the source node to the destination node. The delay values associated with the edges may indicate potential performance problems that merit further investigation.

It will be recognized that the various embodiments do not require trace information resulting from the target distributed system implementing remote procedure calls (RPCs). Furthermore, the embodiments work with the trace information that is available, even though the trace data may be less than exhaustive due to starting and stopping of nodes, missed messages, and tracing limitations during peak activity. The processes also are adapted to handle trace information from nodes in which the reference clocks are not synchronized.

Figure 1:
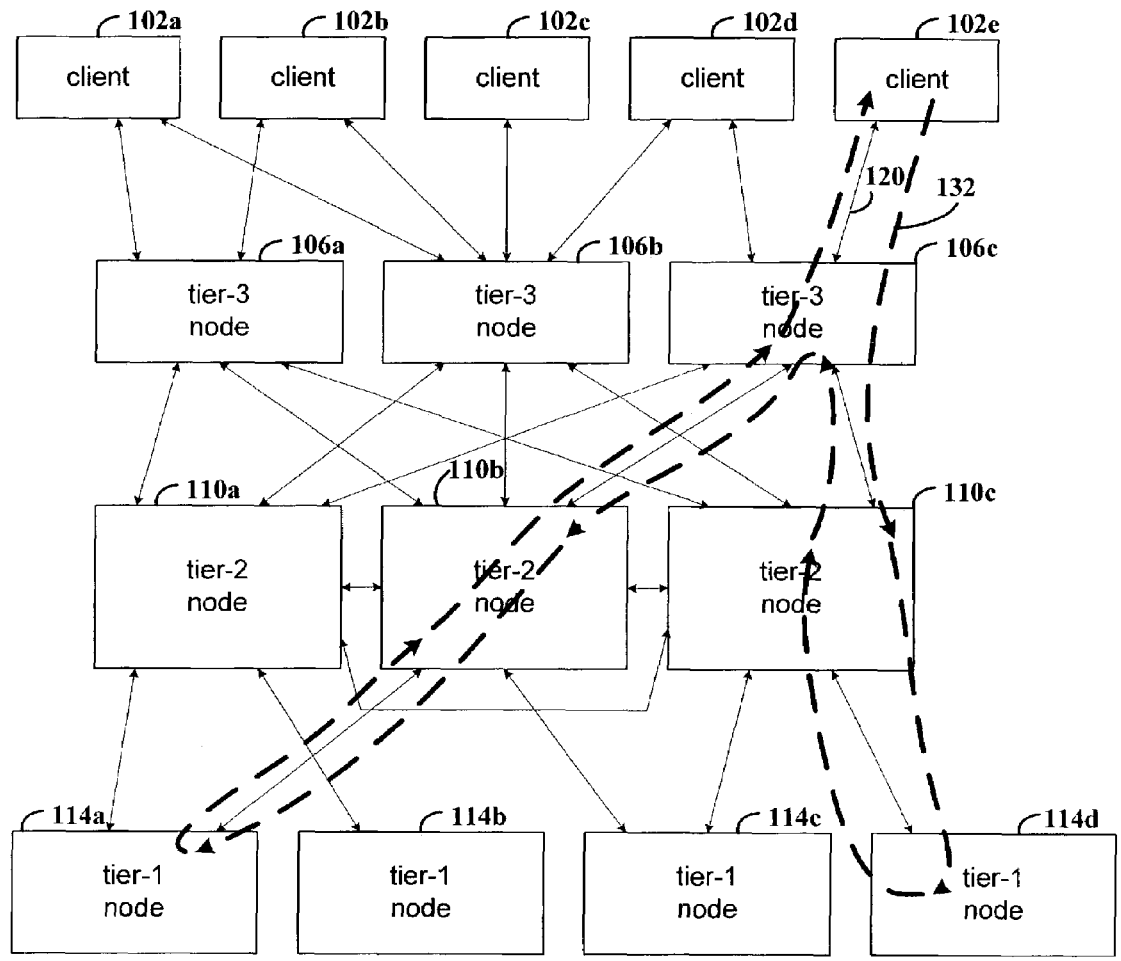
FIG. 1 is a block diagram of an example multi-tier data processing arrangement in which an example causal path is illustrated in accordance with embodiments of the invention.

FIG. 1 is a block diagram of an example multi-tier data processing arrangement in which an example causal path is illustrated. The example tiers include clients 102a-e, which communicate with tier-3 nodes 106a-c. The tier-3 nodes communicate with tier-2 nodes 110a-c, and the tier-2 nodes communicate with one another and communicate with tier-1 nodes 114a-d. The particular functions provided by the nodes in the various tiers are application dependent. For example, one or more data centers may host web servers that are tier-3 nodes 106a-c, application servers that are tier-2 nodes 110a and 110b, an authentication server that is tier-2 nodes 110c, and database servers that are tier-1 nodes 114a-d. Even though it is not shown, it will be appreciated that the network components, such as switches and routers could also be nodes that are considered in a causal path.

The solid, directional lines between the nodes represent communication activity between the nodes. For example, line 120 represents bi-directional communication activity between client 102e and tier-3 node 106c. The communication events between nodes may be referred to as messages. From a collection of messages that are exchanged between the nodes, a causal path may be inferred. For example, dashed line 132 illustrates a hypothetical causal path. Inferring a causal path assumes that there is some causality between messages sent between different nodes. For example, a message directed to a first node may result in one or more messages being sent from the first node to one or more other nodes.

The example causal path 132 represents a possible scenario in which client 102e sends a message to tier-3 node 106c. In response, tier-3 node 106c sends a message to tier-2 node 110c, which in turn sends a message to tier-1 node 114d. Node 114d responds with a message back to node 110c, which returns a message to node 106c. Node 106c sends a message to tier-2 node 110b, which in turn sends a message to tier-1 node 114a. Messages are then sent back up the tiers from node 114a to node 110b, from node 110b to node 106c, and from node 106c to client 102e. It will be appreciated that multiple causal paths may be inferred from an input set of messages, even though only one causal path is illustrated in FIG. 1.

The input set of messages (message trace) from which causal paths may be inferred may be compiled from a number of sources, for example, passive network monitoring (for communication edges that flow between computers), kernel instrumentation, middleware instrumentation, or even application instrumentation.

The information of interest in the trace messages includes a timestamp, a source identifier, and a destination identifier. The timestamp indicates the time at which the message was sent, the source identifier indicates the node from which the message was sent, and the destination identifier indicates the node to which the message was sent. The timestamps of different source nodes (sources for brevity) need not have the same time reference. In some distributed systems, the collecting of trace messages may be distributed along nodes of the system so that different sources are monitored by different entities having local clocks. These clocks need not be synchronized with each other, the clocks need only have approximately the same rate, which is the case if they accurately measure intervals of real time.

Figure 2:
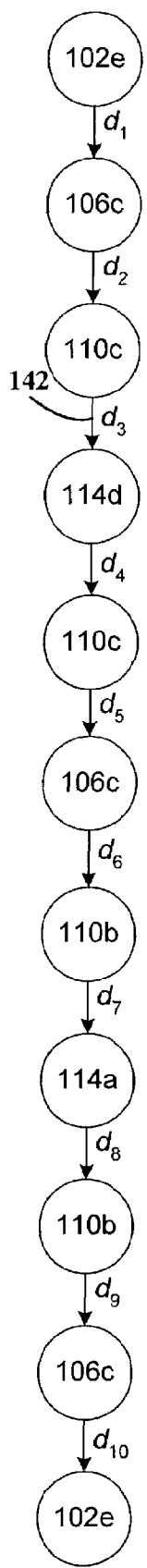
FIG. 2 is a graph of the example causal path from FIG. 1.

FIG. 2 is a graph of the example causal path 132 from FIG. 1. Each of the vertices is labeled with the reference number of the represented node from FIG. 1. For example, the first vertex in the graph is 102e, which represents client node 102e from FIG. 1. Edge 142 connects vertex 110c to vertex 114d and represents a causal relation inferred between messages arriving at node 110c and messages from node 110c to node 114d. A node may be represented by more than one vertex in a graph depending on the inferred casual relations. For example, each of nodes 106c, 110b, and 110c is represented with two vertices in the graph because two causal relations are inferred for each of the nodes.

Whether a causal relation is inferred between messages from a source node to a destination node and messages arriving at the source node depends on a probability distribution of differences between timestamps of messages from the source to the destination and timestamps of messages arriving at the source. For example, in one embodiment if some number of messages from the source to the destination have timestamps indicating approximately equal delays relative to the timestamps of some messages received by the source, a causal relation is inferred between the source and the destination. It will be appreciated that other embodiments may use different probability distributions depending application-specific patterns of communication between nodes. In one embodiment, the causal relation is represented with an edge in the graph, and the most frequent delay is associated with the edge. For example, the edge from vertex 114d to vertex 110c has an associated delay denoted by $d_4$.

Figure 3A:
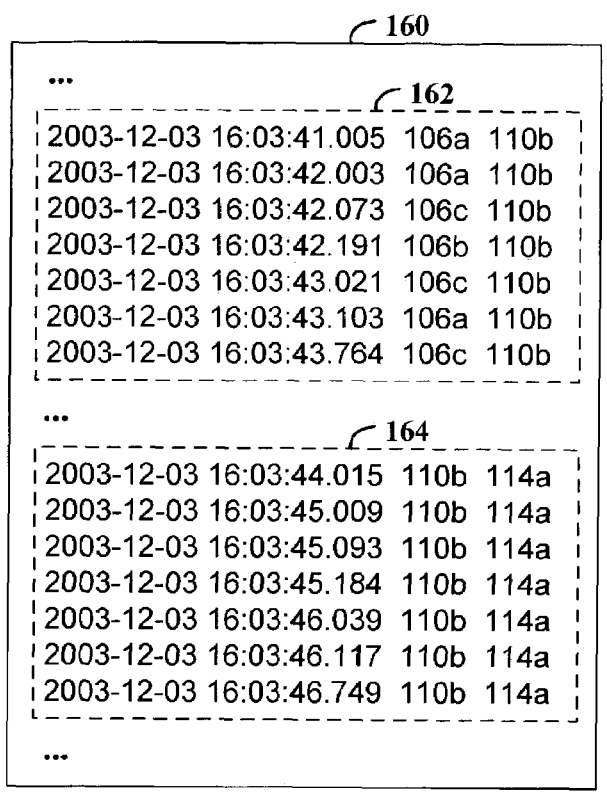
FIG. 3A illustrates an example set of trace messages including two example subsets.
Figure 3B:
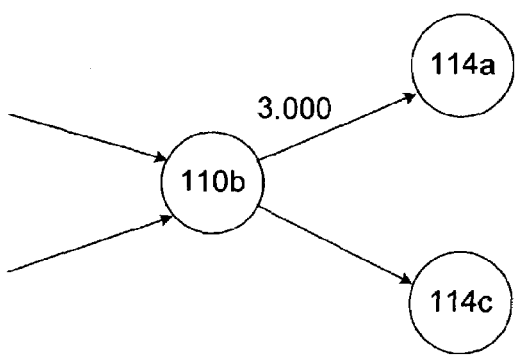
FIG. 3B illustrates part of a graph with an edge representing the causal relation inferred from FIG. 3A in accordance with embodiments of the invention.

FIGS. 3A and 3B illustrate the inference of a causal relation between nodes from a set of traced messages 160. FIG. 3A illustrates an example set of trace messages, with two example subsets shown in blocks 162 and 164, respectively. Subset 162 includes trace messages destined to node 110b, and subset 164 includes trace messages from node 110b and destined to node 114a.

The purpose of presenting the example timestamps is to illustrate a causal relation that may be inferred from messages destined to a node and messages sourced from the node and destined to another node. It will be appreciated that many additional trace messages would likely be present in a complete set of trace data. However, only messages of interest are shown in order to simplify the figures.

From the timestamps it may be observed that each value in subset 164 is offset by approximately 3.000 seconds from one of the values in subset 162. Because there are a number of corresponding messages in subsets 162 and 164 for which this relation is true, it may be inferred that for at least some messages there is approximately a 3.000 second delay between the occurrence of a message destined to node 110*b* and the occurrence of a message sourced from node 110*b* and destined to node 114*a*. In other words, an inference may be made that some messages to node 110*b* cause messages to be generated to node 114*a* with a delay of approximately 3.000 seconds.

FIG. 3B illustrates part of a graph having an edge from vertex 110*b* to vertex 114*a*. The edge from vertex 110*b* to vertex 114*a* represents a causal relation inferred from the subsets 162 and 164 of trace messages. The value 3.000 seconds is associated with the edge from vertex to represent the approximate delay found to occur between the timestamps of subsets 162 and 164.

FIGS. 4-13 describe various embodiments of processes for inferring causal relations between nodes and generating a graph that represents the causal relations. FIG. 4 illustrates an example process 200 for generating a graph in accordance with various embodiments. The process generally considers messages targeted at a given node and the messages sourced from that node to find the likely candidate nodes for the next node in the path and then recurses for each candidate node. The next candidate nodes are found by the aggregation of multiple messages, rather than by examining one event at a time. The process seeks trends in this aggregation, while ignoring messages that are inconsistent with the trend.

The output of the process is a graph representation (output graph) of the causal paths that are inferred. The output graph begins empty (step 202). $T_i$ is the subset of trace messages with source node i as determined from the trace of all messages (step 204).

The process begins with an initial node, represented by variable initial_node, and a vertex is added to the output graph (step 206) to represent the initial node. The process then considers the messages sourced from the initial_node (represented by $T_{initial\_node}$). For each destination node, j, found among these events (step 208), there is a causal relation between the initial_node and j, and an edge is added from the vertex $x_{initial\_node}$ to a vertex that represents node j (step 212). This edge is labeled with a zero delay because, by definition, the initial node does not delay messages.

The process then determines how the path continues from node j by invoking the Process_Node process (step 214), inputting node j, vertex $x_j$, and V (from step 210), which is the set of messages in $T_{initial\_node}$ with having a destination of node j. The Process_Node process 250 (FIG. 5) calls the Find_Caused_Messages process 300 (FIG. 6) with inputs V and $T_j$ to find the subset of messages of $T_j$ that are caused by the messages of V (step 252). Rather than return all the caused messages in a single group, the Find_Caused_Messages process splits those messages into multiple subsets. More precisely, Find_Caused_Messages returns a list, $O_1$, $O_2$, ... $O_m$, where each $O_i$ represents the caused messages events in $T_j$ that have a common delay and destination node. Each element $O_i$ in this list has three fields: $O_i$.messages contains messages of $T_j$, $O_i$.delay is the common delay for the messages in $O_i$.messages, and $O_i$.node is the common destination node for the messages in $O_i$.events. Then, for each such $O_i$, Process_Node creates a new vertex for $O_i$.node, and adds an edge to that vertex from $x_j$ labeled $O_i$.delay (steps 256, 258). Finally, Process_Node calls itself recursively to find out how the path continues from $O_i$.node (step 260).

FIG. 6 illustrates an example process 300 (Find_Caused_Messages) for inferring causation between sets of messages destined to a node and sets of messages sourced from the node. The input to the process includes sets of messages V and Z. All the messages in V have the same destination node, j, and all messages of Z have j as the source node. The Find_Caused_Events process may be understood by way of example.

If for some duration of time d (causal delay), there are some number of messages in Z that appear exactly after time d of some message in V, then it may be inferred that those messages in Z are caused by those messages in V. The process attempts to find these causal delays (steps 304, 306), and for each causal delay found (step 308) the process finds the set $Z_0$ of events in Z corresponding to events in V time shifted by d (step 310). The time shift may be forward (d>=0) or backward (d<=0). A backward shift may occur if, during the gathering of the trace, there was lack of synchronization among clocks of different nodes. The process separates the messages in $Z_0$ by destination node: for each such node, a new list element $O_i$ is created (steps 312, 314, 316).

The Find_Caused_Events process invokes the Find_Correlation process 350 of FIG. 7 to find a cross-correlation between messages destined to a node and subsets of messages sourced from the node. The process begins by converting input message sets V and Z into respective indicator functions $s_1(t)$ and $s_2(t)$, respectively (steps 352, 354). In one embodiment, indicator function $s_1(t)$ is defined as:

$s_1(t)$=1 if $V$ has a message at time [$t-\epsilon$, $t+\epsilon$]/0 otherwise where $\epsilon$ is a selected small, fixed constant. The events of Z are similarly converted into indicator function $s_2(t)$. FIGS. 8A and 8B illustrate example graphs of indicator functions.

If a causal delay d exists, then $s_2(t)$ will include a copy of $s_1(t)$ shifted in time by d. Any causal delay(s) between $s_1(t)$ and $s_2(t)$ is characterized by computing a cross-correlation function (step 356). In one embodiment, the cross-correlation function C(t) is the convolution of $s_2$ and the time inverse of $s_1$. In general terms, C(t) will have a spike at d if and only if $s_2(t)$ contains a copy of $s_1(t)$ time shifted by d.

It will be appreciated that the time inverse of a function s(t) is s(−t). The convolution of two functions f(t) and g(t) is another function denoted f⊗g(t), which is defined as:

$$f \otimes g(t) = \int_{-\infty}^{+\infty} f(u)g(t-u)du.$$

The discrete version of the convolution is:

$$(f \otimes g)_i = \sum_{j=-\infty}^{+\infty} f_j g_{i-j}.$$

If f is replaced with $s_2(t)$ and g is replaced with $s_1(t)$, the following formula results and is used for C(t) in one embodiment:

$$C(t) = \int_{-\infty}^{+\infty} s_1(u, t) s_2(u) du.$$

The discrete version is:

$$C_i = \sum_{j=-\infty}^{+\infty} (s_1)_{j-i} (s_2)_j.$$

Returning now to the Find_Caused_Messages process 300 of FIG. 6, once the cross-correlation function is determined (step 304), the process finds the positions of the spikes in the cross-correlation function (step 308). In an example embodiment, the spikes are determined by computing the mean and standard deviations of C, and defining a spike to exist if it is $N_1$ standard deviations above the mean, where $N_1$ is a small fixed constant, for example, 1. The spike may gradually increase before reaching the peak. To avoid multiple detections of the same spike in nearby points in one embodiment, a spike must fall below $N_0$ standard deviations before another spike is detected, where $N_0 < N_1$ and is another small constant value, for example, 0.8. Other methods of finding spikes in a function may also be suitable.

Each spike may yield many candidate points. These candidate points include points that are $N_1$ standard deviations above the mean to a point $N_0$ deviations below the mean. Among these candidate points, the point with the largest value is selected to represent the spike. Because the position of the spike is the value of interest, the value d such that C(d) is a spike is sought.

FIGS. 8A and 8B illustrate indicator functions that signal occurrences of messages versus time for messages destined to a node and sets of messages sourced from the node respectively. FIG. 8C contains a graph of a cross-correlation function of the indicator functions of FIGS. 8A and 8B. FIG. 8A illustrates the indicator function $s_1(t)$, and FIG. 8B illustrates the indicator function $s_2(t)$. It may be observed that $s_2(t)$ includes a version of $s_1(t)$ that is time shifted by d.

The cross-correlation function of $s_2(t)$ and $s_1(t)$ is shown in FIG. 8C. The graph illustrates that at a delay of d, there is a spike. The spike shows that some number of messages in Z are time shifted by d relative to a corresponding number of messages in V.

Also, for a given time t', C(t') approximates the amount of overlap between $s_1$ and $s_2$ when $s_1$ is shifted by t'. Overlap refers to the times at which both $s_1$ shifted by t' and $s_2$ are non-zero. For example, in FIG. 8C, if t'=0 then there is no overlap because there are no times when both $s_2$ and $s_1$ are non-zero. If t' is a small value then hump 372 of $s_2$ (FIG. 8B) will overlap with hump 374 of $s_1$ (FIG. 8A) because when $s_1$ is shifted right by a slight amount, there will be times when both $s_2$ and $s_1$ are simultaneously non-zero. This overlap is maximum when t'=d, which is where all humps of $s_1$ overlap with all hump of $s_2$.

FIG. 9 is illustrates another embodiment of a Find_Caused_Messsages process 400. Relative to the Find_Caused_Messages process 300 of FIG. 6, the Find_Caused_Messsages process 400 of FIG. 9 first splits the set of messages Z into smaller subsets based on destination node, and then finds the cross-correlation between V and each of the smaller subsets.

The Find_Related_Nodes process 450 (FIG. 10) is invoked (step 404) to return a set of destination nodes that might be of interest. Because Z may have a very large number of destination nodes, the overall process may be slow. Therefore, rather than processing every destination node, a subset of destination nodes is selected based on the likelihood of being relevant.

For each destination node j of interest (step 406), the process selects a subset $Z_0$ of messages from Z with j as the destination node (step 408). The Find_Correlation process 350 is then invoked with V and $Z_0$ (step 410), and the positions of the spikes in the cross-correlation function are found (step 412). For each spike position d (step 414), a subset $Z_1$ of messages is constructed to include messages in $Z_0$ having timestamps equal to timestamps of messages in V shifted by d. A new list element $O_i$ is created for the destination node, delay value, and subset of messages (step 420).

FIG. 10 illustrates an example Find_Related_Nodes process 450 for selecting a relevant set of destination nodes based on a cross-correlation between two sets of messages. The process is similar to the Find_Caused_Message process 300 of FIG. 6. The Find_Related_Nodes process finds a cross-correlation function (step 454) and finds spikes in the cross-correlation function (step 456). For each spike position d (step 458), the process gets the messages in Z having timestamps equal to timestamps in V shifted by d (step 460) and collects in the Nodes set the destination nodes of the messages (step 464).

FIG. 11 illustrates yet another embodiment of a Find_Caused_Messsages process 500. The accuracy of the Find_Caused_Messages process may be further improved by searching for only one spike at a time rather than multiple spikes. The Find_Caused_Messages process 500 searches for only the position d of the largest spike (the maximum value of C(t)).

The Find_Caused_Messages process 500 begins (steps 502, 504, 506, 508) in a manner similar to the Find_Caused_Messages process 400 (FIG. 9). The process then tracks a set $V_0$ of messages, which is initially set to V (step 510). When the number of messages in the smaller of $V_0$ and $Z_0$ reaches less than a selected minimum size (for example, 20 or 30 messages) While loop (step 512) is exited (step 514) and the list $O_1, O_2, \ldots, O_i$ is returned. The process finds a cross-correlation function for $V_0$ and $Z_0$ (step 516). If the maximum value of the cross-correlation function is not prominent, the loop is exited (step 518). A prominent value may be defined to be that the value is a selected number of standard deviations, for example 2 or 3, above the mean.

The process then establishes d as the position of the maximum of the cross-correlation function (step 520). $Z_1$ is assigned the subset of messages in $Z_0$ having timestamps and equal to timestamps of messages $V_0$ in shifted by d (step 522). $V_1$ is assigned the subset of messages in $V_0$ having timestamps equal to timestamps of messages $Z_1$ in shifted by –d (step 524). The list element $O_i$ is then updated (step 526), and messages in $V_1$ and $Z_1$ are removed from sets $V_0$ and $Z_0$, respectively (step 528).

FIG. 12 illustrates yet another embodiment of a Find_Caused_Messsages process 550. The previously described Find_Caused_Messages processes 300, 400, and 500 may be improved further to address the following issue. Suppose that when a message arrives at a node j, node j delays by either $d_1$ or $d_2$, with probability of ½ each, before generating a message to a destination node. Then only about half as many messages that arrive in node j leave node j for each delay $d_1$ or $d_2$. Thus, when the Find_Caused_Messages process reaches node j, it will tend to return subsets $O_i$ that have half as many events as in V. If there are many nodes similar to j, then as the process progresses further in the causal path, there will be fewer and fewer messages available for consideration. With fewer messages to consider, accuracy may be impaired.

A second issue is that the output graph for node j will have two outgoing edges, one for $d_1$ and another for $d_2$. If there are many nodes like j, an exponential increase in the number of nodes may result, which will likely clutter the output graph.

The Find_Caused_Messages process 550 addresses these issues by merging together the sets $Z_1$ for different delays (steps 562 and 580) and then creating a single $O_i$ for all delays. It will be appreciated that the definition of $O_i$ is slightly modified to encompass a set of delays rather than a single delay (steps 564 and 586). The consequence is that each edge of the graph will be labeled with a set of one or more delay values rather than a single delay value. It can be seen that the remaining steps of the Find_Caused_Messages process 550 are the same as corresponding steps in the Find_Caused_Messages process 500 (FIG. 11).

FIG. 13 illustrates another embodiment for selecting sets of relevant destination nodes according to a Find_Related_Nodes process 600. It will be appreciated the teachings of the embodiment of the Find_Caused_Messages process 500 (FIG. 11) may be adapted to improve the Find_Related_Nodes process as illustrated by process 600. A compromise between speed and accuracy may be obtained by finding multiple destination nodes that occur frequently rather than finding just one frequently occurring destination node.

The set of Nodes to be returned begins as an empty set (step 602), and $V_0$ and $Z_0$ are initialized to the input sets V and Z, respectively. A processing loop (step 606) is performed until certain exit conditions occur. The processing of steps 608, 610, 612, 614, and 616 is similar to the processing described for steps 514, 516, 518, 520, and 522 in the Find_Caused_Messages process 500 (FIG. 11).

Node i is established as the node that is the most frequent destination in the $Z_1$ subset of messages (step 618). Node i is then added to the output set of Nodes (step 620), and the $Z_2$ subset of messages is assigned the messages in the $Z_1$ subset of messages having as the destination node i (step 622). A $V_2$ subset of messages is established as the messages in $V_0$ having timestamps equal to timestamps of messages in $Z_2$ shifted by –d (step 626). Messages in $V_2$ and $Z_2$ are then removed from sets $V_0$ and $Z_0$, respectively (step 626). Upon exit from the loop, the set of Nodes is returned (step 628).

The following discussion describes various additional alternative embodiments. In one alternative embodiment, discrete indicator functions are provided to function with discrete variables rather than continuous variables in order to improve processing efficiency. A time quantum, µ, is chosen and t is treated as an integer that represents multiples of µ. The various parts of the processes that use t may be modified accordingly. The indicator functions $s_1(t)$ and $s_2(t)$ are redefined as follows:

$s_1(t)$=1 if V has a message during times $[t\mu, (t+1)\mu]$ 0 otherwise where t is an integer.

The $s_1$ indicator function may be alternatively defined as:

$s_1(t)$=number of messages in V during times $[t\mu, (t+1)\mu]$ where t is an integer. Yet another alternative is to define the $s_1$ indicator function as:

$s_1(t)$=square root of the number of messages in V during times $[t\mu, (t+1)\mu]$ where t is an integer.

It will be appreciated that the $s_2$ indicator function may be similarly defined using Z instead of V as the message set. For either alternative, the indicator functions may be represented by arrays in which each cell in the array represents a time quantum and the value of the cell represents the number of messages in the time quantum.

Another embodiment addresses the situation where the delays are not uniform. The method involves convolving the indicator functions with an arbitrary curve that may model the variance of delays. For example, the curve could be a Gaussian function or a triangle centered at the origin. This change may be implemented after step 354 in the Find_Correlation process 350 (FIG. 7), by adding the following code:

$s_1$:=convolution($s_1$, curve)

$s_2$:=convolution($s_2$, curve)

If the curve is a triangle or a Gaussian, the width of the triangle or the variance of the Gaussian can be input parameters to the process, and the chosen value may depend on the maximum variance expected for the delays. Application of this process may smooth spikes in the indicator functions with the expectation that there will be spikes in the cross-correlation of $s_1(t)$ and $s_2(t)$ even when there are variations in the delay.

Variances in the delay may also be addressed by considering messages having delays that are close to one another when collecting subsets of messages in the Find_Caused_Messages processes 300, 400, and 400. For example, various steps in these processes are similar to:

X:=messages in Y having timestamps equal to timestamps of messages in Z shifted by d where X, Y, and Z vary according to the particular version of and location within the process. The respective steps may be modified as:

X:=messages in Y having timestamps within a of timestamps of messages in Z shifted by d where α is a parameter with a value selected according to the magnitude of the delay variations.

In various other embodiments, the processes are adapted to address undesirable causal paths that may be found. That is, some causal paths may be inferred from the trace messages when in fact there is no causality. This may be problematic if the number of undesirable paths is so large that the useful paths are obscured. One way to deal with undesirable paths is to remove paths that are caused by a small number of messages. An alternative approach is to weight the edges based on the number of messages from which a causal relation is inferred.

To avoid undesirable paths, the Process_Node process 250 (FIG. 5) may be modified to avoid processing subsets $O_i$ that have too few events. This may be accomplished by conditioning on the number of messages the creation of a vertex and the recursive invocation of the Process_Node process 250 (FIG. 5). Specifically, steps 258 and 260 of the Process_Node process 250 may be changed as follows:

if |W|>MinSize then add a new vertex $x_k$ labeled k and edge $(x_j, x_k)$ labeled d in the output graph Process_Node (k, $x_k$, W)

where MinSize is a constant, for example, in the range of 20 to 30.

In another embodiment, the Process_Node process 250 may be adapted to prevent formation of paths that may be undesirably short. For example, if the traced messages indicate a causal path A→B→C→B→A, then the causal path A→B→A is also likely to be detected because there are messages from B to A after some reasonably regular delay of the messages from A to B. This situation may be addressed by discarding edges that immediately return to the previous node in the path. However, it is desired for the process to still allow, in the example above, the edge C→B. Thus, such an edge is allowed to return to the previous node only if there are no other edges leaving the current node. The Process_Node process 250 may be adapted to take an extra input, prev_node:

Process_Node(prev_node, j, $x_j$, V)

Step 260 is modified to pass this extra parameter to Process_Node:

Process_Node(j, k, $x_k$, W)

Step 214 is similarly modified:

Process_Node(dummy, j, $x_j$, V)

where dummy is the name of a node that does not exist, since there is no previous node.

Lastly, steps 258 and 260 of the Process_Node process are modified as follows:

if(k≠prev_node) or ($O_i$.node is equal to k for every i) then create vertex $x_k$ labeled k and edge $(x_j, x_k)$ labeled d in the output graph Process_Node (k, $x_k$, W)

Negative time shifts may also be found if the cross-correlation function C has a spike at a negative value of t. This may be a result of statistical chance or different time references in the timestamps and may result in inaccuracies in the output graph. If it is known that the time references were synchronized during collection of the trace messages, then negative time shifts may be ignored because the negative values will be due to statistical chance. The Process_Node process 250 may be modified to condition execution of steps 258 and 260 on d≧0. That is, if d≧0 then steps 258 and 260 are executed.

The output graph may have cycles that repeat many times if the trace messages exhibit periodic behaviors. For example, suppose that there is a message from A to B every 1 second for 1 hour, and similarly from B to C and from C to A. Then the process may infer that the messages from A to B are causing the messages from B to C, which in turn are causing the messages from C to A, which cause events from B to A, and so on. The output graph would have a long cycle: A→B→C→A→B→C . . . This output is undesirable because it might obscure useful information or cause the process to execute for a very long time since the run-time is a function of the size of the output graph.

An example embodiment to address this situation is to impose a maximum number of times, M, that a node can repeat itself in a path, where M is a small constant, for example, 4 or 5. This may be implemented by adapting the Process_Node process 250 to condition execution of steps 258 and 260 on whether node k has appeared fewer than M times in the path from $x_{initial\_node}$ to $x_j$.

In another embodiment, weights may be associated with edges so that relevant information may be later separated from irrelevant information. This may be implemented by changing step 258 of the Process_Node process 250 to add a weight to the edge. The weight may be either a function of the number of messages in W or a function of the quality of the spike that originated the edge. "Quality" may be defined in a variety of ways, for example, by the number of standard deviations separating the mean and the spike. The weight may alternatively be a function of both the number of messages in W and the quality of the spike.

Those skilled in the art will appreciate that various alternative data processing and or processor arrangements would be suitable for hosting the processes and data structures of the different embodiments of the present invention. In addition, the processes may be provided via a variety of computer-readable media or delivery channels such as magnetic or optical disks or tapes, electronic storage devices, or as application services over a network.

The present invention is believed to be applicable to a variety of systems for performance analysis, and is believed to be beneficial in analyzing the performance of distributed systems. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for determining causal relations between a plurality of intercommunicating nodes, comprising:

inputting trace data that describe inter-node communication, the trace data including for each message sent between nodes a timestamp that indicates a time at which the message was sent, a source identifier that identifies a node from which the message was sent, and a destination identifier that identifies a node to which the message was sent;

determining for each of one or more nodes whether one or more causal relations exist between a first set of messages destined to the node and a second set of messages sourced from the node and destined to at least one other node, wherein a causal relation exists as a function of a probability distribution of delay values that are differences between timestamps of messages in the second set and timestamps of messages in the first set; and generating a processor-readable representation of the nodes and causal relations.

2. The method of claim 1, wherein the nodes are represented as vertices and the causal relations are represented as edges that connect the vertices, the method further comprising associating with edges information that indicates estimated time delays between nodes as a function of the delay values.

3. The method of claim 2, wherein a causal relation exists if timestamps of a selected number of messages in the second set are offset from timestamps of messages in the first set by approximately equal delay values.

4. The method of claim 3, further comprising, if a causal relation is determined between messages to a first node and messages from the first node to a second node and associated, approximately equal delay values are negative, then discarding the causal relation.

5. The method of claim 3, further comprising:
determining from the timestamps in the trace data a first indicator function of times of the messages destined to the source node;
determining from the timestamps in the trace data a second indicator function of times of the messages sourced from the source node and destined to the destination node;
determining a cross-correlation function of the first and second indicator functions;
determining whether a relative peak is present in the cross-correlation function; and
if a relative peak is present, associating the delay value at the relative peak with an edge from a vertex representing the source node to a vertex representing the destination node.

6. The method of claim 5, further comprising if a relative peak is present, associating a weight value with the edge from the vertex that represents the source node to the vertex that represents the destination node, wherein the weight value is a function of a number of pairs of messages in the first set and second set having approximately equal delay values.

7. The method of claim 5, further comprising if a relative peak is present, associating a weight value with the edge from the vertex that represents the source node to the vertex that represents the destination node, wherein the weight value is a function of characteristics of the relative peak.

8. The method of claim 3, further comprising:
determining from the timestamps in the trace data a first indicator function of times of the messages destined to the source node;
convolving the first indicator function with a distribution function that models an expected variance of the approximately equal delay values, whereby a convolved-first indicator function is generated;
determining from the timestamps in the trace data a second indicator function of times of the messages sourced from the source node and destined to the destination node;
convolving the second indicator function with the distribution function, whereby a convolved-second indicator function is generated;
determining a cross-correlation function of the convolved-first and convolved-second indicator functions;
determining whether a relative peak is present in the cross-correlation function; and
if a relative peak is present, associating the delay value at the relative peak with an edge from a vertex representing the source node to a vertex representing the destination node.

9. The method of claim 1, further comprising, if a first causal relation is determined between messages to a first node and messages from the first node to a second node, a second causal relation is determined between messages to the second node and messages from the second node to the first node, and if some other causal relation is detected between messages from the first node to the second node and messages from the second node to a node other than the first node, then discarding the second causal relation.

10. The method of claim 1, wherein the nodes are represented as vertices and the causal relations are represented as edges that connect the vertices, the method further comprising:
associating with edges information that indicates estimated time delays between nodes as a function of the delay values; and
limiting to a selected maximum number, vertices that represent a particular node in a path from an initial vertex.

11. The method of claim 1, wherein determining causal relations comprises:
for messages from a source node and destined to one or more destination nodes, forming one or more subsets of messages, wherein messages in each subset are destined to a common destination node;
determining from the timestamps in the trace data a first indicator function of times of the messages destined to the source node;
determining from the timestamps in the trace data one or more second indicator functions, each second indicator function corresponding to one of the subsets of messages and being a function of times of the messages sourced from the source node and destined to the common destination node of messages in the subset;
determining one or more cross-correlation functions from the first indicator function and the one or more second indicator functions;
determining in each cross-correlation function whether a relative peak is present; and
generating a representation of a causal relation for each relative peak.

12. The method of claim 1, wherein determining causal relations comprises:
for each second set of messages from a source node and destined to one or more destination nodes, forming one or more subsets of messages, wherein messages in each subset are destined to a common destination node;
determining from the timestamps in the trace data a first indicator function of times of the messages destined to the source node;
determining from the timestamps in the trace data one or more second indicator functions, each second indicator function corresponding to one of the subsets of messages and being a function of times of the messages sourced from the source node and destined to the common destination node of messages in the subset;
determining one or more cross-correlation functions from the first indicator function and the one or more second indicator functions;
determining in each cross-correlation function whether a relative peak is present;
generating a representation of a causal relation for each relative peak;
if a relative peak is present in a cross-correlation function of the first indicator function and one of the one or more second indicator functions, removing from the first set messages associated with the relative peak, and removing messages associated with the relative peak from the subset that corresponds to the one of the one or more second indicator functions; and
repeating for each subset of messages the steps of determining a cross-correlation function, determining a relative peak, representing each relative peak, and removing messages until a relative peak is not present.

13. The method of claim 12, wherein the repeating step is performed while at least a selected minimum number of messages remain in the first set of messages and in the subset of messages.

14. The method of claim 1, wherein the nodes are represented as vertices and the causal relations are represented as edges that connect the vertices, and the step of determining causal relations further comprises:
for each second set of messages from a source node and destined to one or more destination nodes, forming one or more subsets of messages, wherein messages in each subset are destined to a common destination node;
determining from the timestamps in the trace data a first indicator function of times of the messages destined to the source node;
determining from the timestamps in the trace data one or more second indicator functions, each second indicator function corresponding to one of the subsets of messages and being a function of times of the messages sourced from the source node and destined to the common destination node of messages in the subset;
determining one or more cross-correlation functions from the first indicator function and the one or more second indicator functions;
determining in each cross-correlation function whether a relative peak is present;
if a relative peak is present in the cross-correlation function of the first indicator function and one of the one or more second indicator functions, adding a delay value at the relative peak to a set of delay values associated with an edge from a vertex representing the source node to a vertex representing the destination node of the subset of messages that corresponds to the one of the one or more second indicator functions, removing from the first set messages associated with the relative peak, and removing from the subset messages associated with the relative peak; and
repeating for each subset of messages the steps of determining a cross-correlation function, determining a relative peak, representing each relative peak, and removing messages until a relative peak is not present.

15. The method of claim 1, wherein determining causal relations comprises:
for messages from a source node and destined to one or more destination nodes, selecting a subset of the one or more destination nodes, wherein each destination node in the subset is a destination in at least a selected number of the messages, and forming one or more subsets of messages, wherein messages in each subset are destined to a common destination node in the selected subset of destination nodes;
determining from the timestamps in the trace data a first indicator function of times of the messages destined to the source node;
determining from the timestamps in the trace data one or more second indicator functions, each second indicator function corresponding to one of the subsets of messages and being a function of times of the messages sourced from the source node and destined to the common destination node of messages in the subset;
determining one or more cross-correlation functions from the first indicator function and the one or more second indicator functions;
determining in each cross-correlation function whether a relative peak is present; and
generating a representation of a causal relation for each relative peak.

16. An apparatus for determining causal relations between a plurality of intercommunicating nodes, comprising:
means for inputting trace data that describe inter-node communication, the trace data including for each message sent between nodes a time value that indicates a time at which the message was sent, a source identifier that identifies a node from which the message was sent, and a destination identifier that identifies a node to which the message was sent;
means for determining for each of one or more nodes whether one or more causal relations exist between a first set of messages destined to the node and a second set of messages sourced from the node and destined to at least one other node, wherein a causal relation exists as a function of a probability distribution of delay values that are differences between timestamps of messages in the second set and timestamps of messages in the first set; and
means for generating a processor-readable representation of the nodes and causal relations.

17. The apparatus of claim 16, wherein a causal relation exists if timestamps of a selected number of messages in the second set are offset from timestamps of messages in the first set by approximately equal delay values, and the nodes are represented as vertices and the causal relations are represented as edges that connect the vertices, the apparatus further comprising means for associating with edges information that indicates estimated time delays between nodes as a function of the delay values.

18. The apparatus of claim 17, further comprising means for weighting a representation of a causal relation as a function of a detected number of messages in the second set that are offset from timestamps of the detected number of messages in the first set by approximately equal delay values.

19. The apparatus of claim 17, further comprising means for eliminating representation of a cycle of vertices and edges.

20. An article of manufacture for determining causal relations between a plurality of intercommunicating nodes, comprising:
a computer-readable medium configured with instructions for causing a processor-based system to perform the steps of,
inputting trace data that describe inter-node communication, the trace data including for each message sent between nodes a timestamp that indicates a time at which the message was sent, a source identifier that identifies a node from which the message was sent, and a destination identifier that identifies a node to which the message was sent;
determining for each of one or more nodes whether one or more causal relations exist between a first set of messages destined to the node and a second set of messages sourced from the node and destined to at least one other node, wherein a causal relation exists as a function of a probability distribution of delay values that are differences between timestamps of messages in the second set and timestamps of the selected number of messages in the first set; and
generating a processor-readable representation of the nodes and causal relations.

21. The article of manufacture of claim 20, wherein the nodes are represented as vertices and the causal relations are represented as edges that connect the vertices, and the computer-readable medium is further configured with instructions for causing a processor-based system to perform the step of associating with edges information that indicates estimated time delays between nodes as a function of the delay values.

22. The article of manufacture of claim 21, wherein a causal relation exists if timestamps of a selected number of messages in the second set are offset from timestamps of messages in the first set by approximately equal delay values.

23. The article of manufacture of claim 22, wherein the computer-readable medium is further configured with instructions for causing a processor-based system to perform the steps of:
  determining from the timestamps in the trace data a first indicator function of times of the messages destined to the source node;
  determining from the timestamps in the trace data a second indicator function of times of the messages sourced from the source node and destined to the destination node;
  determining a cross-correlation function of the first and second indicator functions;
  determining whether a relative peak is present in the cross-correlation function; and
  if a relative peak is present, associating the delay value at the relative peak with an edge from a vertex representing the source node to a vertex representing the destination node.

24. The article of manufacture of claim 23, wherein the computer-readable medium is further configured with instructions for causing a processor-based system to perform the step of associating, if a relative peak is present, a weight value with the edge from the vertex that represents the source node to the vertex that represents the destination node, wherein the weight value is a function of a number of pairs of messages in the first set and second set having approximately equal delay values.

25. The article of manufacture of claim 23, wherein the computer-readable medium is further configured with instructions for causing a processor-based system to perform the step of associating a weight value with the edge from the vertex that represents the source node to the vertex that represents the destination node if a relative peak is present, wherein the weight value is a function of characteristics of the relative peak.

26. The article of manufacture of claim 21, wherein the computer-readable medium is further configured with instructions for causing a processor-based system to perform the step of discarding a causal relation if the causal relation is determined between messages to a first node and messages from the first node to a second node and associated, approximately equal delay values are negative.

27. The article of manufacture of claim 21, wherein the computer-readable medium is further configured with instructions for causing a processor-based system to perform the step of limiting to a selected maximum number, vertices that represent a particular node in a path from an initial vertex.

28. The article of manufacture of claim 20, wherein the computer-readable medium is further configured with instructions for causing a processor-based system to perform the step of discarding a particular causal relation, if a first causal relation is determined between messages to a first node and messages from the first node to a second node, the particular causal relation is determined between messages to the second node and messages from the second node to the first node, and if some other causal relation is detected between messages from the first node to the second node and messages from the second node to a node other than the first node.

29. The article of manufacture of claim 20, wherein the instructions for determining causal relations further comprise instructions for:
  for messages from a source node and destined to one or more destination nodes, forming one or more subsets of messages, wherein messages in each subset are destined to a common destination node;
  determining from the timestamps in the trace data a first indicator function of times of the messages destined to the source node;
  determining from the timestamps in the trace data one or more second indicator functions, each second indicator function corresponding to one of the subsets of messages and being a function of times of the messages sourced from the source node and destined to the common destination node of messages in the subset;
  determining one or more cross-correlation functions from the first indicator function and the one or more second indicator functions;
  determining in each cross-correlation function whether a relative peak is present; and
  generating a representation of a causal relation for each relative peak.

30. The article of manufacture of claim 20, wherein the instructions for determining causal relations further comprise instructions for:
  for each second set of messages from a source node and destined to one or more destination nodes, forming one or more subsets of messages, wherein messages in each subset are destined to a common destination node;
  determining from the timestamps in the trace data a first indicator function of times of the messages destined to the source node;
  determining from the timestamps in the trace data one or more second indicator functions, each second indicator function corresponding to one of the subsets of messages and being a function of times of the messages sourced from the source node and destined to the common destination node of messages in the subset;
  determining one or more cross-correlation functions from the first indicator function and the one or more second indicator functions;
  determining in each cross-correlation function whether a relative peak is present;
  generating a representation of a causal relation for each relative peak;
  if a relative peak is present in a cross-correlation function of the first indicator function and one of the one or more second indicator functions, removing from the first set messages associated with the relative peak, and removing messages associated with the relative peak from the subset that corresponds to the one of the one or more second indicator functions; and
  repeating for each subset of messages the steps of determining a cross-correlation function, determining a relative peak, representing each relative peak, and removing messages until a relative peak is not present.

31. The article of manufacture of claim 20, wherein the instructions for determining causal relations further comprise instructions for:
  for messages from a source node and destined to one or more destination nodes, selecting a subset of the one or more destination nodes, wherein each destination node in the subset is a destination in at least a selected number of the messages, and forming one or more subsets of messages, wherein messages in each subset are destined to a common destination node in the selected subset of destination nodes;

determining from the timestamps in the trace data a first indicator function of times of the messages destined to the source node;

determining from the timestamps in the trace data one or more second indicator functions, each second indicator function corresponding to one of the subsets of messages and being a function of times of the messages sourced from the source node and destined to the common destination node of messages in the subset;

determining one or more cross-correlation functions from the first indicator function and the one or more second indicator functions;

determining in each cross-correlation function whether a relative peak is present; and generating a representation of a causal relation for each relative peak.

\* \* \* \* \*

UNITED STATES PATENT AND TRADEMARK OFFICE
CERTIFICATE OF CORRECTION

PATENT NO. : 7,254,646 B2 Page 1 of 1
APPLICATION NO. : 10/601371
DATED : August 7, 2007
INVENTOR(S) : Marcos Kawazoe Aguilera et al.

It is certified that error appears in the above-identified patent and that said Letters Patent is hereby corrected as shown below:

In column 10, line 48, after "within" delete "a" and insert -- α --, therefor.

Signed and Sealed this

Twenty-third Day of June, 2009

JOHN DOLL
*Acting Director of the United States Patent and Trademark Office*